(12) United States Patent
Feig et al.

(10) Patent No.: US 12,151,643 B2
(45) Date of Patent: Nov. 26, 2024

(54) RESTRAINING DEVICE HAVING A SEATBELT AND HAVING A BELT PRETENSIONER

(71) Applicant: Volkswagen Aktiengesellschaft, Wolfsburg (DE)

(72) Inventors: Sebastian Feig, Wolfsburg (DE); Michael Przybyla, Calberlah (DE); Joerg Parrer, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/135,356

(22) Filed: Apr. 17, 2023

(65) Prior Publication Data

US 2023/0256934 A1   Aug. 17, 2023

Related U.S. Application Data

(63) Continuation of application No. PCT/EP2021/078560, filed on Oct. 15, 2021.

(30) Foreign Application Priority Data

Oct. 16, 2020   (DE) .................... 10 2020 213 098.1

(51) Int. Cl.
*B60R 22/46*   (2006.01)
*B60R 22/18*   (2006.01)

(52) U.S. Cl.
CPC .. *B60R 22/4619* (2013.01); *B60R 2022/1818* (2013.01)

(58) Field of Classification Search
CPC ........ B60R 22/4619; B60R 2022/1818; B60R 22/46; B60R 22/4628; B60R 22/18
See application file for complete search history.

(56) References Cited

U.S. PATENT DOCUMENTS 6,382,674 B1 * 5/2002 Specht ................ B60R 22/1951
   297/480
7,364,201 B2   4/2008 Lutz et al.
(Continued)

FOREIGN PATENT DOCUMENTS

DE      3624155 C2    7/1988
DE    19737469 A1    3/1999
(Continued)

OTHER PUBLICATIONS

Bissinger, Support Structure For A Vehicle Seat, Vehicle Seat And Vehicle, Jan. 2, 2020, EPO, DE 102018210515 A1, Machine Translation of Description (Year: 2020).*

(Continued)

*Primary Examiner* — Paul N Dickson
*Assistant Examiner* — Matthew D Lee
(74) *Attorney, Agent, or Firm* — Muncy, Geissler, Olds & Lowe, P.C.

(57) ABSTRACT

A restraining device for a motor vehicle occupant, having a seatbelt that is equipped with a belt pretensioner via which the tensile force on the seatbelt can be increased. A vehicle seat is equipped with a tubular receptacle as a seat cross tube that simultaneously accommodates the belt pretensioner in its interior. The belt pretensioner, which is designed as a linear pretensioner, has a coupling element for the seatbelt, which coupling element is translationally movable along an axis of motion in the tubular receptacle and is connected to a drive cylinder by a tensioner. For this purpose, the seatbelt is reduced to approximately half its width by rolling up opposite side edges by a guide element so that the belt pretensioner can be accommodated without any difficulty in a seat cross tube with a small inside diameter.

11 Claims, 3 Drawing Sheets

(56) References Cited

U.S. PATENT DOCUMENTS

| | | | |
|---|---|---|---|
| 10,870,410 B2 * | 12/2020 | Jabusch | B60N 2/688 |
| 2002/0096872 A1 * | 7/2002 | Herrmann | B60R 22/28 |
| | | | 280/805 |
| 2002/0140278 A1 * | 10/2002 | Hlavaty | B60R 22/4676 |
| | | | 297/464 |

FOREIGN PATENT DOCUMENTS

| | | | | |
|---|---|---|---|---|
| DE | 19960848 A1 | | 6/2001 | |
| DE | 20200741 U1 | | 5/2002 | |
| DE | 102018210515 A1 | * | 1/2020 | |
| WO | WO-2006019607 A2 | * | 2/2006 | ........... B60R 22/022 |

OTHER PUBLICATIONS

International Search Report dated Feb. 16, 2022 in corresponding application PCT/EP2021/078560.

* cited by examiner

RESTRAINING DEVICE HAVING A SEATBELT AND HAVING A BELT PRETENSIONER

This nonprovisional application is a continuation of International Application No PCT/EP2021/078560, which was filed on Oct. 15, 2021, and which claims priority to German Patent Application No 10 2020 213 098.1, which was filed in Germany on Oct. 16, 2020, and which are both herein incorporated by reference.

BACKGROUND OF THE INVENTION

Field of the Invention

The present invention relates to a restraining device for a motor vehicle occupant, having a seatbelt, which is divided in a usage position by a seatbelt buckle into a top section of the seatbelt extending diagonally over the chest region of the occupant as a shoulder belt and a bottom section of the seatbelt extending in the hip region of the occupant as a lap belt, and having a belt pretensioner by means of which a tensile force can be transmitted to the lap belt and/or the shoulder belt in a critical driving situation, and having a guide element for the seatbelt with an inlet opening and an outlet opening, wherein the width of the inlet opening corresponds to at least the width of the seatbelt, and the width of the outlet opening is considerably smaller than the width of the seatbelt, so that the cross section of the seatbelt is curved and/or folded at least once on its side facing the belt pretensioner in a longitudinal direction of the seatbelt. In addition, the invention relates to a vehicle seat having a restraining device.

DESCRIPTION OF THE BACKGROUND ART

A restraining device is used in practice to reduce the forward displacement of the occupant from his seat due to an accident, and thus the risk of injury from a possible impact with elements of the motor vehicle body or equipment. To this end, such restraining devices are equipped with a belt pretensioner by which means the seatbelt is tightened in the event of an accident even before the onset of the forward displacement.

For this purpose, on the one hand mechanical systems are used as belt pretensioners in which the mechanical deformation in the front body section through deflection of cable pulls, for example. Furthermore, pyrotechnic systems are also known, in which a propellant charge provides the necessary belt pretensioning.

Belt pretensioners are also already known from the prior art that have a piston-cylinder unit, a drive for the piston-cylinder unit, and a force transmission that is connected directly to the piston-cylinder unit and, at least in the case of restraint, to the seatbelt, and converts the motion in the piston-cylinder unit caused upon activation of the drive into a displacement of the seatbelt. Such belt pretensioner systems are also known as so-called linear pretensioners. They can be designed as anchor or buckle pretensioners.

The conventional pyrotechnic linear pretensioners used in vehicles produce a force of 2-2.5 kN within a shortest possible time of 5-12 msec in a cylinder-piston unit, with which force the seatbelt is retracted in order to eliminate the belt slack.

DE 197 37 469 C2 describes a belt pretensioning device for seatbelts in motor vehicles. The entry region of the belt strap is guided for this purpose into the belt retractor through a belt folder located on the belt retractor, in which folder the belt strap is folded into multiple layers by tucking-in the two outer longitudinal edges thereof onto the belt strap, thus reducing the belt strap width, and is wound onto the belt shaft in the folded state. For example, one outer longitudinal edge of the belt strap is tucked in by the belt folder to two-thirds of the belt strap width, and the remaining third of the belt strap width is turned over by the belt folder with the opposite outer longitudinal edge overlapping the partially folded belt strap and folded together, resulting in a three-layered winding of the belt strap, which is now only one third the belt strap width, on the belt shaft. Along with the disproportionate increase in the diameter relative to the length of the retracted belt strap during the tightening process, this is also intended to achieve a smaller installation size, which then permits installation in a rear bench seat, for example.

In addition, a seatbelt for vehicles is known from DE 36 24 155 C2, having a belt strap, automatic belt retractor, and deflection fitting with a belt guide slot. To achieve a narrow width dimension of the belt strap in the region of the center column between the deflection fitting and the automatic belt retractor, the belt strap is guided through the guide slot in a folded fashion.

The considerable space required for the belt retractor and the design effort for a spherical piston movable along a curved path by means of a propellant charge prove to be disadvantageous in practice. Furthermore, practical experiments have already shown that winding the belt strap that is folded multiple times leads to an undesirable rapid increase in the diameter of the winding, and thus in the length of the belt strap retracted per revolution, on the one hand. In addition, the folded belt strap also requires lateral guidance during winding, since otherwise the individual layers shift relative to one another. However, this guidance increases frictional losses, and can also cause the winding to jam.

SUMMARY OF THE INVENTION

It is therefore an object of the invention to increase operating reliability and at the same time to make optimal use of the available installation space for the restraining device.

According to an exemplary embodiment of the invention, therefore, the belt pretensioner of the inventive restraining device has a movable coupling element that is translationally movable along a straight axis of motion in an at least partly tubular receptacle by means of a propellant charge, and that is connected directly or by a tensioner to the seatbelt that is folded in multiple layers, tucked in, or rolled up. In this way, an extremely compact construction of the belt pretensioner is achieved, which has a narrow width on account of the upstream guide element for reducing the width of the seatbelt. In particular, the tubular receptacle can thus have an inside diameter or a maximum clear width that is dimensioned significantly smaller than the belt strap width, for example less than half the width of the seatbelt. For this purpose, the seatbelt is preferably tucked in or rolled up on both sides symmetrically to its main extent by means of the guide element. In this case, the seatbelt can even be rolled up in such a manner that a winding with multiple turns having a winding axis parallel to the main extent of the seatbelt is produced. Since the multiple layers of the same belt strap section thus produced are not wound up and pressed against one another during the process as in the prior art, but instead are moved translationally by the tensioner designed as a piston rod or wire cable, no jamming or other increase in frictional resistance occurs, even in the case of a belt strap that is tucked in multiple times, so that the operating reliability can also be significantly improved along with the reduction in required installation space that can be achieved in this way. Nor does the tucking-in or rolling-up of the belt strap lead to a reduction in the breaking load of the belt strap, of course, since undesirable kinks, such as in the belt pretensioning devices with belt retractors known from the prior art, are fundamentally precluded simply on account of the translational motion. The tubular receptacle encloses, preferably fully, the piston along with the actuator present for its actuation, for example a cylinder, as well as the seatbelt, in order to optimally protect them from environmental effects but also from crash-induced damage.

Furthermore, the receptacle can be integrated into an existing seat structure without any difficulty, and can also be used as a supporting member, if appropriate. An embodiment of the invention is accordingly especially advantageous in which the receptacle simultaneously constitutes a structural element, for example a seat cross tube of a vehicle seat, in particular a movable vehicle seat. On the one hand, this achieves a short spatial distance of the belt pretensioner from the vehicle occupant, and thus short transmission paths. On the other hand, the belt pretensioner is movable together with the seat in the passenger compartment, for example in order to adjust individually desired seat positions. The relative position between the vehicle occupant and the belt pretensioner therefore always remains unchanged. In addition, the latter can also be removed together with the seat from the vehicle, or corresponding seats having the restraining device according to the invention and which, moreover, meet the most stringent safety requirements, can be added later to increase passenger capacity.

The invention is not limited to those belt pretensioners also referred to as linear pretensioners, which consist of a piston that is movable in a cylinder. Instead, the force that is transmitted to the translationally movable coupling element can also be generated by other means, wherein a flexible tensioner can also be arranged between the force generator and the coupling element, for example. The belt pretensioner can consequently also be arranged vertically in a backrest or inclined with respect to the vertical, for example. It is especially advantageous, however, when the coupling element is designed to be at least substantially horizontally movable.

The guide element can be shaped such that the inlet opening and the outlet opening are arranged in parallel planes. Furthermore, the guide element can also be designed to be curved or twisted in a helix so that the planes of the inlet and outlet openings are parallel to one another, but the main axes of the planes of the inlet and outlet openings, whose basic shape is oval, do not run parallel.

The planes of the inlet opening and of the outlet opening enclose an acute angle with one another, so that deflection for the seatbelt is integrated into the guide element. Moreover, the guide element can also be designed such that it can pivot about a horizontal axis, for example, in order to thus make possible an automatic alignment of the angular position corresponding to the specific path of the belt strap for different vehicle occupants.

The seatbelt that has been reduced in width by means of the guide element can be deflected into the receptacle in the direction of the axis of motion by means of a deflector element so that the frictional losses that occur can be substantially reduced by means of the deflector element that, for example, is provided with a guide eye. For this purpose, the deflector element can have, in particular, a friction-reducing surface finish. Moreover, guide rollers can also be employed.

Furthermore, it proves to be especially advantageous when the guide element is designed as a formed sheet metal part from a one-piece sheet metal blank, wherein the inlet opening and the outlet opening are connected by sections of the guide element. Preferably, the guide element is designed as an open, formed part in such a manner that the seatbelt can be inserted not only through the inlet or outlet opening, but also transversely thereto, wherein a slotlike aperture running between the inlet and outlet openings with a width corresponding to at least the material thickness of the belt strap is sufficient and can preferentially be used.

Furthermore, the guide element can have, at least in the region of the outlet opening in an edge region connecting at least the inlet opening and the outlet opening and facing the respective side edge of the seatbelt, a formation that is concave, in particular curved in the shape of a circular arc, wherein the radius of the edge region curved in the shape of a circular arc decreases steadily from the inlet opening to the outlet opening. As a result, the seatbelt experiences a deflection at its edges as a curling or arching that increases during the course of its passage through the guide element until the lateral edges of the seatbelt ultimately meet in a center region on the surface of the seatbelt.

The concave edge region of the guide element can surround the respective side edge of the seatbelt by more than 180°. In this case, the shaping of the edge regions of the guide element on both sides of its longitudinal axis can be identically designed. Moreover, the radii of the opposite edge regions of the guide element can also be differently dimensioned in such a manner that the side edges of the seatbelt overlap one another in order to thus achieve even more compact dimensions up to a seatbelt that is tightly rolled in its transverse direction with a spiral arrangement of the layers of the belt strap in cross-section.

A vehicle seat is also provided, which can be equipped with such a restraining device and the belt pretensioner is arranged in an at least partly tubular receptacle, wherein the receptacle is designed as a seat cross tube connecting two opposite seat side sections. According to the invention, the concept of "vehicle seat" includes individual seats, such as, e.g., the driver's seat, as well as bench seats for multiple people, which can also be adjustable in inclination or into a reclining position, which can be removed from the motor vehicle, or which can merely be folded from a non-use position into a use position as needed.

The vehicle seat can be arranged in the motor vehicle such that it can swivel and/or is translationally movable in the direction of at least two horizontal spatial axes so that it permits a variable arrangement in the passenger compartment, for example even with an orientation opposite the direction of travel.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
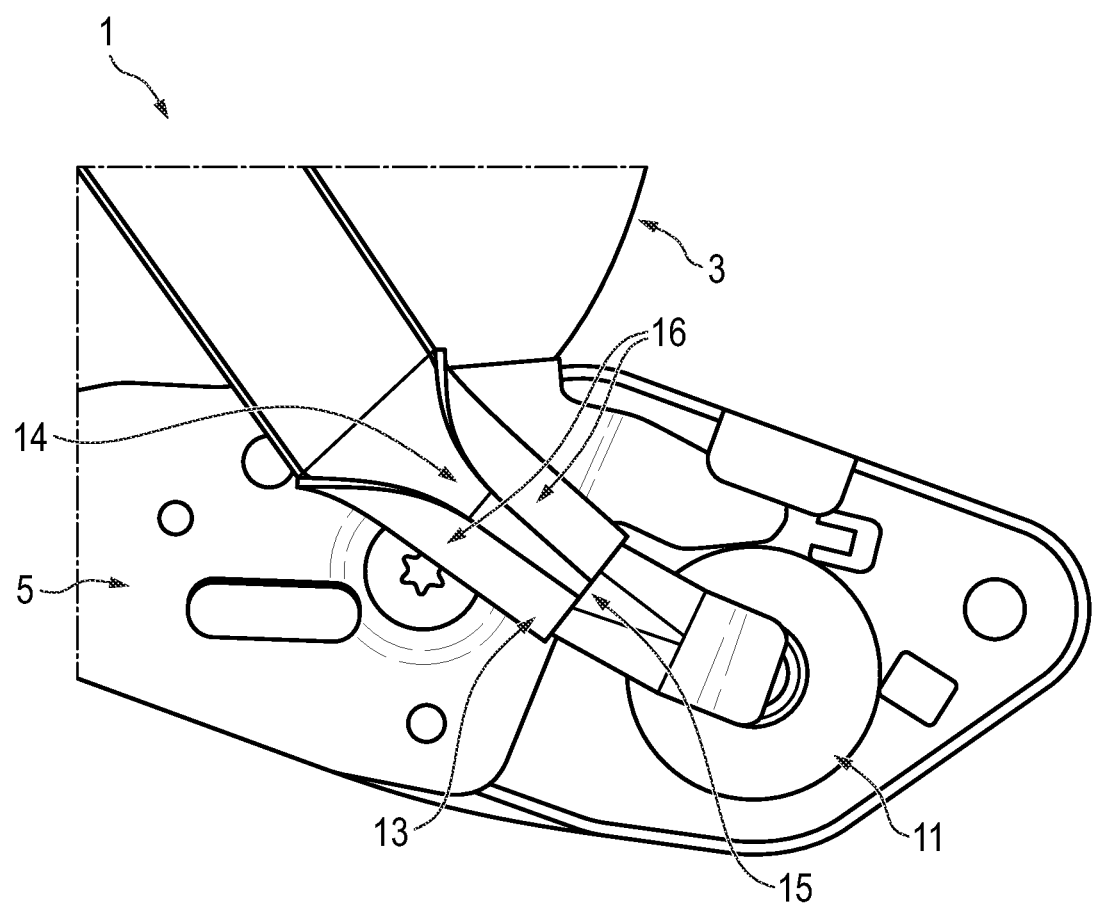
FIG. 1 is a detail of a restraining device according to the invention with a guide element for the seatbelt in a side view.
Figure 2:
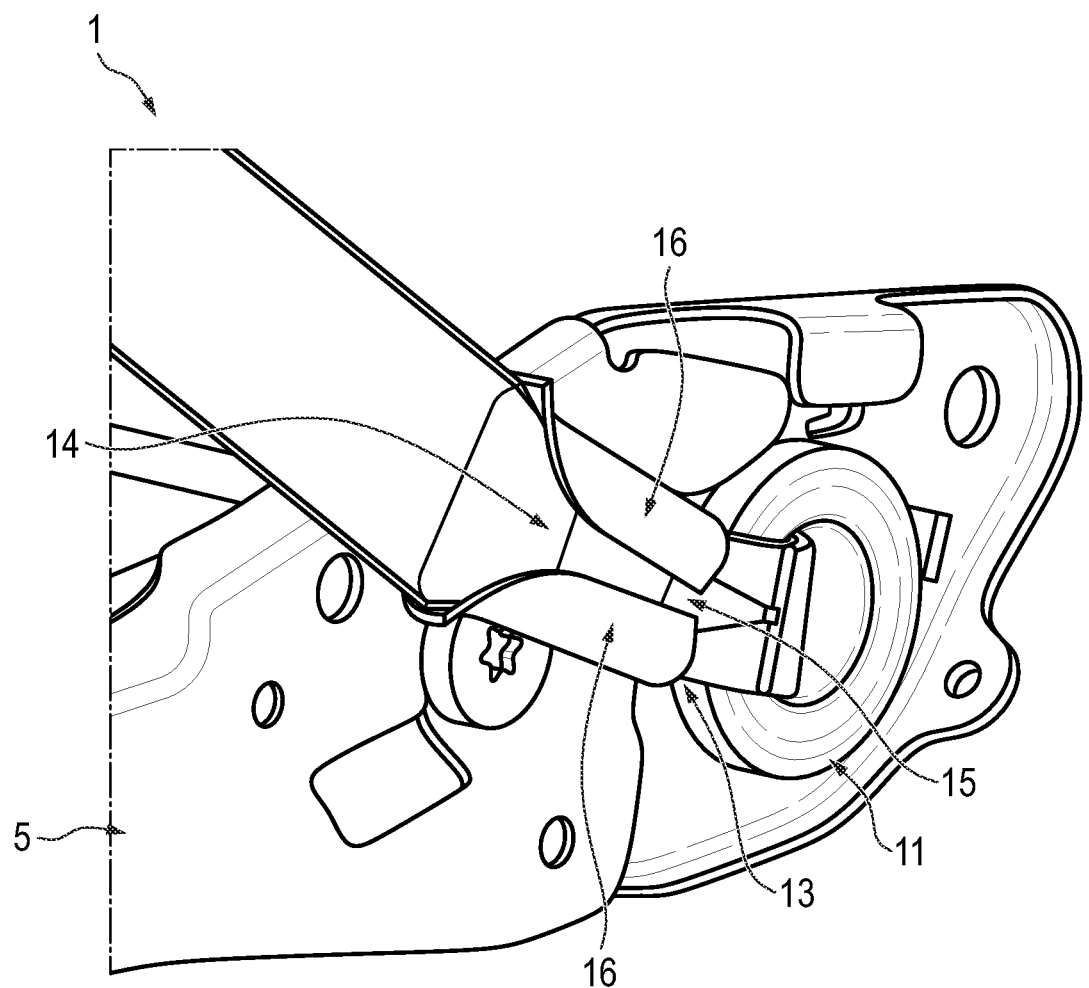
FIG. 2 is a perspective representation of the restraining device shown in FIG. 1.
Figure 3:
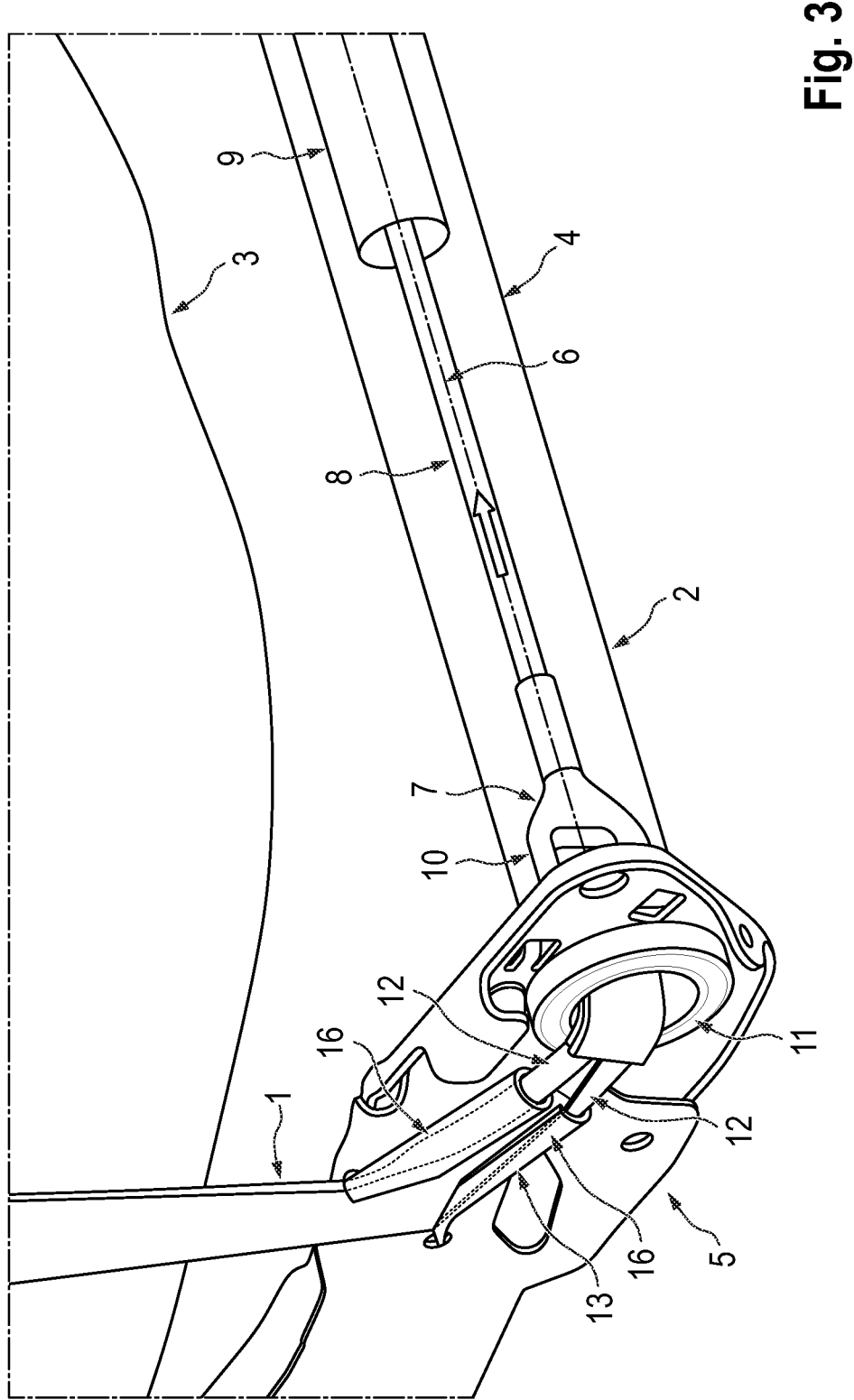
FIG. 3 is a rear, perspective representation of the restraining device shown in FIGS. 1 and 2 with a belt pretensioner.

A restraining device according to the invention for an occupant of a motor vehicle, having a seatbelt 1, part of whose bottom section of the seatbelt 1 extends in the hip region of the occupant as a lap belt is shown, is explained in detail below on the basis of FIGS. 1 to 3. The restraining device is equipped on its side facing away from a seatbelt buckle, in practice preferably the lateral side, with a belt pretensioner 2, by which means a tensile force can be transmitted to the seatbelt 1 in a critical driving situation in order to thus remove a belt slack of the seatbelt 1 or to create a preloading opposite the undesirable forward displacement of the occupant. A vehicle seat 3 is equipped with a tubular receptacle 4, which is designed as a seat cross tube connecting two mutually opposite seat side sections 5 of the seat structure and which simultaneously accommodates the belt pretensioner 2 in its interior. The belt pretensioner 2, which is designed as a linear pretensioner, has a coupling element 7 for the seatbelt 1, which coupling element is translationally movable along an axis 6 of motion in the direction of the arrow in the tubular receptacle 4 by means of a propellant charge and is connected to a drive cylinder 9 by a tensioner 8. The coupling element 7 has an eye-shaped formation 10 to which a belt strap loop of the seatbelt 1 is non-detachably secured. As can be seen, the seatbelt 1 is reduced to approximately half its width for this purpose by rolling up opposite side edges 12 of the seatbelt 1 in the region of a deflector element 11 serving as a lead-in. In order to achieve a defined belt folding upon a triggering of the belt pretensioner 2, the restraining device is equipped with a guide element 13 for the seatbelt 1 that is equipped with an inlet opening 14 and an outlet opening 15. In this case, the width of the inlet opening 14 approximately corresponds to the width of the belt strap, while the width of the outlet opening 15 is considerably smaller than the width of the belt strap, so that the seatbelt 1 experiences an arching of its cross section on its side facing the belt pretensioner 2 in a longitudinal direction of the seatbelt 1 and/or is folded at least once, causing the seatbelt 1 to be fed to the belt pretensioner 2 in multiple layers. For this purpose, the guide element 13 has opposite, symmetrical edge regions 16 with a formation that is curved in the shape of a circular arc by approximately 180°, wherein the radius of the edge regions 16 decreases steadily in the direction of the belt pretensioner 2 so as to achieve a progressive reshaping of the seatbelt 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A restraining device for a motor vehicle occupant, the restraining device comprising:
    a seatbelt;
    a belt pretensioner via which a tensile force is transmitted to the seatbelt;
    a guide element for the seatbelt that is provided with an inlet opening and an outlet opening for the seatbelt, a width of the inlet opening corresponding to at least a width of the seatbelt, and a width of the outlet opening being dimensioned significantly smaller than the width of the seatbelt, such that a portion of the seatbelt is provided with a reduced width; and
    a coupling element provided for the belt pretensioner, the coupling element being translationally movable along a straight axis of motion in an at least partly tubular receptacle and being connected to the seatbelt,
    wherein outer edge regions of the guide element, that connect the inlet opening and the outlet opening, enclose outer side edges of the seatbelt by more than 180°, such that due to the outlet opening having the width that is smaller than the width of the inlet opening, the outer side edges of the seatbelt are folded at least once into multiple layers to form the portion of the seatbelt provided with the reduced width, and the portion of the seatbelt provided with the reduced width is attached to the coupling element so that the multiple layers of the portion of the seatbelt provided with the reduced width are fed to the belt pretensioner.

2. The restraining device according to claim 1, wherein the at least partly tubular receptacle also is a structural element of a vehicle seat or a movable vehicle seat.

3. The restraining device according to claim 1, wherein the at least partly tubular receptacle is arranged in the motor vehicle to be movable together with the vehicle seat with respect to a body structure.

4. The restraining device according to claim 1, wherein the coupling element is at least horizontally movable.

5. The restraining device according to claim 1, wherein a plane of the inlet opening and a plane of the outlet opening enclose an acute angle with one another.

6. The restraining device according to claim 1, wherein the guide element is a formed sheet metal part from a one-piece sheet metal blank.

7. The restraining device according to claim 1, wherein the outer edge regions of the guide element, that connect the inlet opening and the outlet opening, are curved in a shape of a circular arc towards the outer side edges of the seatbelt, at least in a region of the outlet opening, such that in the region of the outlet opening, the outer side edges of the seatbelt are rolled inward to form the portion of the seatbelt that is provided with the reduced width.

8. A vehicle seat comprising the restraining device according to claim 1.

9. The vehicle seat according to claim 8, wherein the vehicle seat is arranged in the motor vehicle such that the vehicle seat is adapted to swivel and/or translationally move in a direction of at least two horizontal spatial axes.

10. The restraining device according to claim 1, wherein the outlet opening of the guide element is dimensioned to be less than half the width of the seatbelt.

11. A restraining device for a motor vehicle occupant, the restraining device comprising:
    a seatbelt;
    a belt pretensioner via which a tensile force is transmitted to the seatbelt;
    a guide element for the seatbelt that is provided with an inlet opening and an outlet opening for the seatbelt, a width of the inlet opening corresponding to at least a width of the seatbelt, and a width of the outlet opening being dimensioned smaller than the width of the seatbelt, such that a portion of the seatbelt is provided with a reduced width; and a coupling element provided for the belt pretensioner, the coupling element being translationally movable along a straight axis of motion in an at least partly tubular receptacle and being connected to the seatbelt, wherein the portion of the seatbelt that has been provided with the reduced width by the guide element is deflected into the at least partly tubular receptacle in a direction of the axis of motion by a deflector element.

\* \* \* \* \*